United States Patent [19]

Okada et al.

[11] 4,355,141

[45] Oct. 19, 1982

[54] POLYMERIZING VINYL CHLORIDE IN REACTOR TREATED WITH CONDENSATES

[75] Inventors: Hiroshi Okada; Seiichi Masuko; Kuniyuki Gotoh, all of Nagoya; Takehiko Mogi, Tokai, all of Japan

[73] Assignee: Mitsui Toatsu Chemical, Inc., Tokyo, Japan

[21] Appl. No.: 265,498

[22] Filed: May 20, 1981

[51] Int. Cl.$^3$ ............................ C08F 2/20; C08F 2/02
[52] U.S. Cl. ..................... 526/62; 525/504; 526/202; 526/212; 528/165
[58] Field of Search ........................................... 526/62

[56] References Cited

U.S. PATENT DOCUMENTS 4,200,712  4/1980  Cohen ................................... 526/62
4,220,743  9/1980  Englin .................................. 526/62
4,256,863  3/1981  McOhie ................................ 526/62

*Primary Examiner*—C. A. Henderson
*Attorney, Agent, or Firm*—Sughrue, Mion, Zinn, Macpeak & Seas

[57] ABSTRACT

In the polymerization of vinyl chloride, the adhesion of the resulting polymer to the walls can be prevented by previously applying a specific chemical to the inner walls of the polymerization tank and parts of the device to be contacted with the monomer during the polymerization. This specific chemical is a copolycondensate obtained by reacting a resol type phenol/formaldehyde precondensate with a nitrogen-containing compound selected from the group consisting of nitrophenols, nitrobenzoic acids, nitrobenzenesulfonic acids, aminophenols, aminobenzoic acids and aminobenzenesulfonic acids.

4 Claims, No Drawings

POLYMERIZING VINYL CHLORIDE IN REACTOR TREATED WITH CONDENSATES

BACKGROUND OF THE INVENTION

The present invention relates to an improved process for the homopolymerization or copolymerization of vinyl chloride. More particularly, the present invention relates to a process for preventing the adhesion of polymer to the inner walls of the polymerization tank or parts of the device with which the monomer is to be contacted during the polymerization as well as a coating agent used therefor.

In the homopolymerization of vinyl chloride or the copolymerization thereof with a monomer copolymerizable therewith (hereinafter referred to as the polymerization), the resulting polymer adheres to the inner walls of the polymerization tank and parts of the device with which the monomer is to be contacted during the polymerization operation such as reflux condenser, stirring blades, baffles and joints with pipes to cause problems such as the reduction in cooling capacity of the polymerization tank or the contamination of the vinyl chloride homopolymer or copolymer (hereinafter referred to as product) with the polymer which has been peeled off after the adhesion thereto, thereby degrading the quality of the product. Therefore, the polymerization tank has generally been cleaned each time after completion of the polymerization and before the subsequent batch in the prior art. A great deal of labor and a considerable time are required for the cleaning and, in addition, a reduction in operation rate and an increase in costs of the product are invited.

Various processes have been proposed for the prevention of the polymer from adhesion to the inner walls of the polymerization tank. However, those processes are still unsatisfactory from commercial viewpoint, since they have defects such as the retardation of polymerization velocity and deterioration of physical properties of the product, though they are effective for the prevention of the polymer adhesion.

Further, processes which do not exert an ill influence on the polymerization velocity or physical properties of the product have also been proposed. However, those processes have disadvantages that the effects of preventing the polymer adhesion are unsatisfactory. For example, U.S. Pat. No. 4,093,787 discloses a process for the polymerization of vinyl chloride wherein the reaction is carried out in a reactor having an inner wall on which there has been deposited an insoluble layer of a cross-linked polymeric material containing polar groups formed from a reaction mixture having an aldehyde as one component thereof. According to this process, the polymerization velocity is not reduced surely, since the polymeric material deposited on the wall is hardly eluted into the vinyl chloride polymerization reaction liquor because of its cross-linked structure (i.e. three-dimensional structure). It is considered that the effects of this process for the prevention of the polymer adhesion by means of a coated layer of polymeric material are obtained because the polymeric material per se acts as a radical scavenger or because the hydrophilic polymeric material makes the wall oleophobic, thereby repelling the vinyl chloride monomer. However, if the cross-linked polymeric material is used as in the process of U.S. Pat. No. 4,093,787, said effects are reduced. For example, a cross-linked condensate formed from phenol and formaldehyde known as a phenolic resin is ineffective for the prevention of the polymer adhesion, since it has neither hydrophilic properties nor radical-scavenging effect.

SUMMARY OF THE INVENTION

An object of the present invention is to provide a practical polymerization process of vinyl chloride wherein the polymer adhesion is prevented sufficiently without deleteriously affecting the properties of the resulting polymer.

Another object of the present invention is to provide a coating agent to be applied to the inner walls of the vinyl chloride polymerization device so as to prevent the adhesion of the resulting polymer to the surface thereof.

After intensive investigations, the inventors have found that if a liquid chemical is previously applied to the inner walls of polymerization tank and parts of polymerization device and attachments thereof which are used for the polymerization of vinyl chloride and with which the monomer is to be contacted, the adhesion of the polymer thereto is reduced remarkably and, even if it is adhered in a small amount, it can easily be removed by washing with water. The present invention has been attained on the basis of this finding.

The present invention provides a process for the homopolymerization of vinyl chloride or copolymerization thereof with a monomer copolymerizable therewith either in an aqueous medium or by the bulk polymerization technique, characterized in that walls of the polymerization tank and parts of the device to be contacted with the monomer during the polymerization are coated with a copolycondensate obtained by reacting a precondensate of phenol and an aldehyde with a nitrogen-containing compound selected from the group consisting of nitrophenols, nitrobenzoic acids, nitrobenzenesulfonic acids, aminophenols, aminobenzoic acids and aminobenzenesulfonic acids.

DETAILED DESCRIPTION OF THE INVENTION

According to the present invention, there is used as the coating agent a copolycondensate obtained by reacting a precondensate of phenol and an aldehyde with a nitrogen-containing compound selected from the group consisting of nitrophenols, nitrobenzoic acids, nitrobenzenesulfonic acids, aminophenols, aminobenzoic acids and aminobenzenesulfonic acids. The term "phenol" herein involves monohydric phenols such as the phenol per se, cresol and ethylphenol; polyhydric phenols such as resorcin and hydroquinone; bisphenols such as bisphenol A; and nuclear substitution products of those compounds. The term "aldehyde" herein involves organic compounds containing CHO group such as formaldehyde, acetaldehyde and furfural. In the process of the present invention, it is convenient to use a precondensate mainly comprising phenol and formaldehyde (or paraformaldehyde) which is easily available on the market at low costs. As the precondensate of phenol and aldehyde used in the present invention, resol-type phenol/formaldehyde precondensate produced in the presence of a basic catalyst is used. In this reaction, formaldehyde is used in an excess amount relatively to phenol. As the basic catalysts, there may be used sodium hydroxide, potassium hydroxide, ammonia and amines. As for the molecular weight of the precondensate, it has 1–5 nuclei in average. Number of nuclei herein indicates a number of benzene nuclei contained in one molecule of the condensate. Though the precondensate of phenol and aldehyde per se also has the effect of preventing the polymer adhesion, this effect is improved remarkably by further copolycondensing the same with the above nitrogen-containing compound. The inventors cannot explain reasons therefore theroretically. However, it is considered that if the precondensate of phenol and aldehyde is copolycondensed with the nitrogen-containing compound, the nitrogen-containing compound is effectively arranged in the molecule of the copolycondensate to exhibit the radical-scavenging effect or hydrophilic effect.

The nitrogen-containing compound to be copolycondensed with the precondensate of phenol and aldehyde in the present invention is selected from the group consisting of nitrophenols, nitrobenzoic acids, nitrobenzenesulfonic acids, aminophenols, aminobenzoic acids and aminobenzenesulfonic acids. As the nitrophenols used in the present invention, there may be mentioned mononitromonohydroxybenzenes and derivatives thereof such as nitrophenol, nitroanisole, nitrophenetole and hydroxynitrotoluene; mononitropolyhydroxybenzenes and derivatives thereof such as nitrocatechol, nitroguaiacol, nitroresorcin, nitrohydroquinone, nitropyrogallol and nitrophloroglucinol; dinitromonohydroxybenzenes and derivatives thereof such as dinitrophenol, dinitroanisole and dinitrohydroxytoluene; and dinitropolyhydroxybenzenes and derivatives thereof such as dinitrocatechol, dinitroguaiacol, dinitroresorcin and dinitrohydroquinone.

As the nitrobenzoic acids, there may be mentioned, for example, nitrobenzoic acid and dinitrobenzoic acid.

As the nitrobenzenesulfonic acids, there may be mentioned, for example, nitrobenzenesulfonic acid, nitrobenzenedisulfonic acid and nitrotoluenesulfonic acid.

As the aminophenols, there may be mentioned, for example, monoaminomonohydroxybenzenes and derivatives thereof such as aminophenol, aminoanisole, aminophenetole, N-methylaminophenol, N-dimethylaminophenol and aminocresol; monoaminopolyhydroxybenzenes and derivatives thereof such as aminocatechol, aminoquaiacol, aminoresorcin and aminohydroquinone; and polyaminohydroxybenzenes and derivatives thereof such as diaminophenol, diaminoanisole and diaminoresorcin.

As the aminobenzoic acids, there may be mentioned, for example, aminobenzoic acid, N-methylanthranilic acid and diaminobenzoic acid.

As the aminobenzenesulfonic acids, there may be mentioned, for example, aminobenzenesulfonic acid, methylanilinesulfonic acid, dimethylanilinesulfonic acid, anilinedisulfonic acid, aminotoluenesulfonic acid and phenylenediaminesulfonic acid.

In the present invention, the resol type phenol/formaldehyde precondensate is first prepared in the presence of a basic catalyst. The following addition reaction takes place predominantly using formaldehyde in an excess amount relatively to phenol in the presence of a basic catalyst such as sodium hydroxide, potassium hydroxide, ammonia or an amine at a reaction temperature of 50°-90° C.:

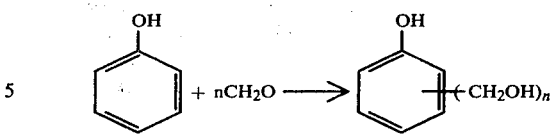

wherein symbol . indicates a position of CH$_2$OH and n represents a number of 1-3.

As a matter of course, the following condensation reaction also takes place:

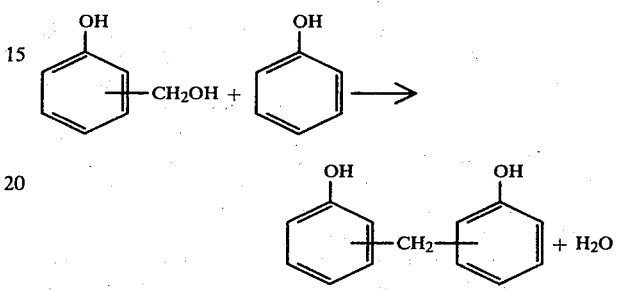

Thus, the phenol/formaldehyde precondensate containing 1-5 nuclei is prepared.

The phenol/formaldehyde precondensate thus obtained is then copolycondensed with said nitrogen-containing compound. Prior to the copolycondensation, unreacted formaldehyde must be removed from the precondensate under reduced pressure. As described above, the effect of preventing the adhesion of the polymer is remarkably improved by the copolycondensation of the phenol/formaldehyde precondensate with the above nitrogen-containing compound. However, if unreacted formaldehyde is present in the precondensate, the nitrogen-containing compound reacts directly with formaldehyde, thereby inhibiting the effective incorporation of the nitrogen-containing compound in the molecule of the final condensate.

The copolycondensation reaction of the phenol/formaldehyde precondensate with the nitrogen-containing compound is effected in the temperature range of 50°-90° C. in the presence of a basic catalyst like the precondensation reaction. The nitrogen-containing compound is used in an amount of 0.1-10 moles per mole of the phenol.

The copolycondensate of the precondensate of phenol/formaldehyde, i.e. resol, and the nitrogen-containing compound (hereinafter referred to as resol/nitrogen-containing compound copolycondensate) used for the coating in the present invention is preferably compatible with 10 wt. % aqueous sodium hydroxide solution. The term "compatibility" herein indicates that if the condensate is mixed with 10% aqueous sodium hydroxide solution, the resulting mixture forms a homogeneous phase irrespective of the mixing ratio. The average scale of the molecule of the condensate compatible with the 10% aqueous sodium hydroxide solution varies over a considerably wide range. Those having 1-20 nuclei are particularly preferred and those having 5-10 nuclei are most preferred.

In carrying out the present invention, a solution of the resol/nitrogen-containing compound copolycondensate is applied to the inner walls of a polymerization tank. The solvent in the solution is preferably an aqueous alkali solution. A solid concentration in the range of 0.05–15 wt. % is convenient for the operation. The term "solid" herein indicates the condensate. Concretely, the solid content is determined by drying a sample in an air bath at 135° C. for one hour and measuring an amount of non-volatile residue.

The term "application" herein does not restrict the manner of application but indicates the formation of a coating layer of the resol/nitrogen-containing compound copolycondensate on the walls. Generally, the application is effected by means of a brush or sprayer. The amount to be coated is also not particularly limited but is preferably 0.005–10 g/m$^2$ in general.

In carrying out the present invention, it is preferred to wash the coating layer of resol/nitrogen-containing compound copolycondensate with water after the layer has been formed. By this treatment, the superfluous coating solution is washed away and the fixation of the resol/nitrogen-containing compound copolycondensate on the walls of the polymerization tank is accelerated, since the copolycondensate is insoluble in neutral water. A further advantage obtained by this treatment is that ill influences of superfluous resol/nitrogen-containing compound copolycondensate such as the retardation of the vinyl chloride polymerization reaction and deterioration of the physical properties of the resulting product can be avoided, since the superfluous copolycondensate is removed. Water used for the washing of the coating film may be replaced with an acidic water having a pH controlled to below 6 with an inorganic acid such as hydrochloric acid, nitric acid, phosphoric acid or carbonic acid or an organic acid such as formic acid, acetic acid or phytic acid.

The coating may be effected each time before the batch polymerization or alternatively several batches of the polymerization may be continued after the coating film has once been formed while the coating film is simply washed with water after each batch.

In the present invention, there may be added in the polymerization step a polar organic compound having affinity with the resol/nitrogen-containing compound copolycondensate to form a hydrophilic coating film having a contact angle with water of up to 2° on the inner walls of the polymerization vessel contacted with the liquid. As the polar organic compound, there are selected compounds which do not exert serious, ill effects on the polymerization reaction of vinyl chloride and which do not deteriorate the qualities of the resulting product. As those compounds, there may be mentioned the following compounds: Alcohols and analogs thereof:

Monohydric, saturated alcohols such as butyl alcohol, hexyl alcohol, cyclohexyl alcohol, octyl alcohol, lauryl alcohol, cetyl alcohol and stearyl alcohol; dihydric, trihydric and tetrahydric alcohols such as glycol, glycerol and erythritol; pentitols (pentahydric alcohols) such as xylitol and arabitol; hexitols (hexahydric alcohols) such as mannitol and sorbitol; as well as monosaccharides, for example, tetroses such as erythrulose; pentoses such as xylose and arabinose; and hexoses such as glucose, fructose and mannose;

oligosaccharides such as maltose and sucrose; and polysaccharides such as starch, dextrin, inulin, pectic acid, alginic acid, mannan and acacia.

Organic acids and alkali, alkaline earth metal and ammonium salts thereof:

Saturated monocarboxylic acids such as acetic acid, propionic acid, butyric acid, lauric acid, palmitic acid, and stearic acid; saturated hydroxymonocarboxylic acids such as glycollic acid, lactic acid and hydroxystearic acid;

Aldehyde- and saturated ketomonocarboxylic acids such as glyoxylic acid and acetoacetic acid;

Saturated polycarboxylic acids such as oxalic acid, malonic acid and succinic acid;

Saturated hydroxypolycarboxylic acids such as malic acid, tartaric acid and citric acid; and Alkali, alkaline earth metal and ammonium salts of the above organic acids;

Esters and Analogs

Esters of the above alcohols and organic acids. As particularly preferred examples of them, the following compounds may be mentioned:

Glycerides such as acetic acid monoglyceride, succinic acid monoglyceride, citric acid monoglyceride, myristic acid monoglyceride, palmitic acid monoglyceride and stearic acid monoglyceride;

Sorbitan fatty acid esters such as sorbitan monolaurate, sorbitan monopalmitate and sorbitan monostearate;

Waxes such as cetyl palmitate;

Acid phosphoric acid esters such as methyl acid phosphate, ethyl acid phosphate, isopropyl acid phosphate, butyl acid phosphate and lauryl acid phosphate;

Sucrose esters such as acetic acid/sucrose ester, palmitic acid/sucrose ester and stearic acid/sucrose ester;

Fatty Acid Amides

Fatty acid amides such as formamide, acetamide, palmitic acid amide and stearic acid amide.

Aminoacids

Amino acids such as glycine, alanine, valine, leucine, isoleucine, serine, threonine, methionine, cystine, aspartic acid, glutamic acid, lysine, arginine, phenylalanine, tyrosine, proline, hydroxyproline, histidine and tryptophane.

Vitamins

Water-soluble vitamins such as thiamine, lactoflavin, nicotinic acid, nicotinic acid amide, pantothenic acid, calcium pantothenate, pantothenic acid amides, folic acid and ascorbic acid.

Chelating agents

Chelating agents such as ethylamine, ethylenediamine, diethylenetriamine, triethylenetetramine, orthohydroxy acids, salicylic acid and derivatives thereof as well as acetylacetone, ethyl acetoacetate, methylamine diacetic acid, nitrylotriacetic acid, ethylenediaminetetraacetic acid (and salts thereof) and chlorophyll.

The process of the present invention can be applied not only to the homopolymerization of vinyl chloride but also to the copolymerization of vinyl chloride with a monomer copolymerizable with vinyl chloride, for example, an olefin such as ethylene or propylene, a vinyl monomer such as vinyl acetate or styrene, an acryl monomer such as acrylonitrile or an acrylic acid ester, or a dicarboxylic acid monomer such as maleic acid, a maleic acid ester, fumaric acid or a fumaric acid ester. Those copolymerizable monomers can be used in an amount of up to 20 wt. % based on the vinyl chloride.

The process of the present invention can be employed effectively under various ordinary polymerization conditions such as aqueous suspension polymerization and aqueous emulsion polymerization of the above monomer(s) as well as mass polymerization which is carried out in the absence of any polymerization medium.

According to the process of the present invention, the effect of preventing the polymer adhesion is remarkably improved as compared with that obtained in the prior art without exerting ill influences such as the retardation of the polymerization reaction velocity or deterioration of physical properties of the product.

The following examples further illustrate the present invention:

PREPARATION EXAMPLE 1

Preparation of phenol/formaldehyde precondensate 2256 g (24 moles) of phenol, 2409 g (38.4 moles) of 40 wt. % formalin and 48 g (1.2 moles) of sodium hydroxide were charged in a reactor provided with a reflux condenser and the mixture was allowed to react at 85° C. for 2 hours. Then, unreacted formalin was completely removed at that temperature under reduced pressure to obtain a resol having a solid concentration of 75 wt. %. The molecular weight of the resulting resol was measured by gel permeation method to reveal that it had 1–3 nuclei in average.

PREPARATION EXAMPLES 2–4

Preparation of resol/nitrogen-containing compound copolycondensate coating solution:

500 g of the resol obtained in above Preparation Example 1 was charged in a reactor provided with a reflux condenser. 54.5 g of para-aminophenol (Preparation Example 2), 68.5 g of para-aminobenzoic acid (Preparation Example 3) or 86.5 g of orthanilic acid (o-aminobenzenesulfonic acid) (Preparation Example 4) was added thereto as shown in Table 1. The copolycondensation reaction was carried out at 85° C. for 2 hours. Then, the copolycondensate was dissolved in 2 wt. % aqueous sodium hydroxide solution to control the solid concentration to 5 wt. %.

EXAMPLES 1–3

The coating solution prepared as above was sprayed on the inner walls of a 7 m³ stainless steel polymerization tank at a rate of 0.5 g/m² with a sprayer. Then, the walls were washed with deionized water. More concretely, resol/para-aminophenol copolycondensate prepared in Preparation Example 2, resol/para-aminobenzoic acid copolycondensate prepared in Preparation Example 3 and resol/orthanilic acid (ortho-aminobenzenesulfonic acid) copolycondensate prepared in Preparation Example 4 were used in Examples 1, 2 and 3, respectively.

After the above treatment, 3000 kg of deionized water, 0.6 kg of t-butyl peroxypivalate and 2 kg of partially saponified polyvinyl alcohol having a saponification degree of 80 molar % were charged therein. Air in the vessel was removed by means of a vacuum pump. Then, 2000 kg of vinyl chloride was charged therein and the reaction was carried out at 57° C. until a pressure of 5 kg/cm² was attained. After completion of the reaction, the unreacted monomer was recovered. After discharging the polymer slurry, amount (weight) of the polymer adhering to the inner walls of the polymerization tank was examined.

The polymer slurry was dehydrated, dried and taken out as the product. Physical properties of the product were measured by methods shown in Table 1. As shown in Table 1, according to the process of the present invention, the adhesion of the polymer was remarkably reduced in amount and the polymer once adhered could easily be washed away with water. The resulting product had excellent physical properties.

COMPARATIVE EXAMPLE 1

The same procedure as in Examples 1–3 was repeated except that the resol/nitrogen-containing compound was not applied at all. The adhesion of the polymer to the inner walls was quite severe as shown in Table 1.

TABLE 1

| Run No. | Comp. Ex. 1 | Ex. 1 | Ex. 2 | Ex. 3 |
|---|---|---|---|---|
| Nitrogen - containing compound | — | p-aminophenol | p-aminobenzoic acid | orthanilic acid |
| Reaction time (hr.) | 11.0 | 11.0 | 11.0 | 11.0 |
| Amount of polymer adhered (g/m²) | 45 | 0.3 | 0.3 | 0.3 |
| Average polymerization degree | 1050 | 1040 | 1050 | 1060 |
| Apparent specific gravity (g/ml) | 0.52 | 0.52 | 0.52 | 0.52 |
| Particle size distribution | | | | |
| Larger than 60 mesh | 0 | 0 | 0 | 0 |
| 61–80 mesh | 37 | 36 | 35 | 38 |
| 81–200 mesh | 60 | 61 | 63 | 59 |
| Smaller than 200 mesh | 3 | 3 | 2 | 3 |
| Number of fish eyes | 5 | 5 | 5 | 5 |

Notes (methods of measurement):
[1] Average polymerization degree: JIS K 6721
[2] Apparent specific gravity: JIS K 6721
[3] Fish eyes: Fish eye test method
PVC 100 g
2-Ethyl hexyl phthalate 50 g
ADVASTAB BC-1000J (trade name: cadmiumbarium stabilizer of Toa Rika Co.) 5g The above mixture was kneaded by means of a two-roll mill having a roll face distance of 0.3 mm at 150° C. for 5 minutes to obtain a sheet. Number of fish eyes in an area of 10 cm×10 cm was counted by the vision through.

EXAMPLE 4

The coating solution of resol/orthanilic acid copolycondensate obtained in Preparation Example 4 was sprayed on inner walls of a 1000 liter polymerization tank lined with glass at a rate of 0.5 g/m² with a sprayer. Then the walls were washed with water. Thereafter, 300 kg of deionized water, 2 kg of sodium laurylsulfate and 4 kg of cetyl alcohol were charged therein. The whole was heated to 55° C. and stirred at a low rate of 50 rpm for 10 minutes to obtain an emulsifier dispersion. Then, the emulsifier dispersion was cooled to 35° C., 0.12 kg of 2,2'-azobis-2,4-dimethylvaleronitrile was added thereto and air was removed therefrom by means of a vacuum pump. 200 kg of vinyl chloride was charged therein and the polymerization reaction was carried out at 50° C. under stirring at 50 rpm till the pressure in the polymerization tank reached 4 kg/cm² to obtain a stable vinyl chloride polymer latex. Aggregation was hardly observed in the polymerization tank. Unreacted monomer was recovered and then the latex was discharged. The conditions of the inner walls were examined to reveal that the polymer adhesion was substantially not caused.

COMPARATIVE EXAMPLE 2

Vinyl chloride was polymerized in the same manner as in Example 4 except that the coating with resol/orthanilic acid copolycondensate was omitted. The conditions of the inner walls of the polymerization tank were examined after the polymerization. The adhesion of a large quantity of the polymer in the form of a film was observed over the whole inner walls.

EXAMPLE 5

A combination of a 4 l. stainless steel vertical polymerization tank and a 6 l. stainless steel horizontal polymerization tank was employed as the polymerization device. 0.2 $g/m^2$ of the coating solution of resol/orthanilic acid copolycondensate obtained in Preparation Example 4 was sprayed on the inner walls of the polymerization tanks and also parts of the device which are to be contacted with vinyl chloride with a sprayer. The walls were washed with water. After those treatments, air was removed from the device by means of a vacuum pump. 1500 g of vinyl chloride and 0.3 g of 2,2'-azobis-2,4-dimethylvaleronitrile were charged in the 4 l. vertical polymerization tank used for the first stage reaction. After carrying out the polymerization reaction at 60° C. for one hour, the contents of the tank were transferred into the 6 l. horizontal polymerization tank used for the second stage reaction. After the transfer, the reaction was continued at 57° C. until the pressure reached 6.5 $kg/cm^2$. The unreacted monomer was recovered and the contents of the tank were discharged. The conditions of the inner walls of the polymerization tanks were examined. The adhesion of the polymer observed was very small in amount. The polymer left on the walls was quite fragile and could be removed easily with water of a hydraulic pressure of as low as 2 $kg/cm^2$. The polymer thus removed was dried and then weighed to reveal that the amount thereof was 4 g in the first stage polymerization tank and 50 g in the second stage polymerization tank.

COMPARATIVE EXAMPLE 3

Vinyl chloride was polymerized in the same manner as in Example 5 except that the coating with the resol/orthanilic acid copolycondensate was omitted. The conditions of the inner walls of the polymerization tank after the polymerization were examined to reveal that the polymer was adhered thereto in a large amount. The polymer left on the walls was firmly adhered thereto and could not be removed with water of a hydraulic pressure of even as high as 15 $kg/m^2$. The polymer removed by a mechanical force had a dry weight of 10 g in the first stage polymerization tank and 480 g in the second stage polymerization tank.

EXAMPLE 6

0.05 $g/m^2$ of the coating solution of resol/orthanilic acid copolycondensate obtained in Preparation Example 4 was applyed to the inner walls of a 7 $m^3$ stainless steel polymerization tank and the inner walls of a tube (which is to be contacted with vinyl chloride) of a stainless steel reflux condenser having a heat transfer area of 5 $m^2$ attached to the tank.

After the above treatment, 3000 kg of deionized water, 0.6 kg of 2,2'-azobis-2,4-dimethylvaleronitrile and 2 kg of partially saponified polyvinyl alcohol having a saponification degree of 72 molar % were charged therein. Air in the tank was removed by means of a vacuum pump. Then, 2000 kg of vinyl chloride was charged therein and the reaction was continued at 57° C. until the pressure reached 5 $kg/cm^2$. In this step, a part of the heat of reaction was removed by means of the reflux condenser from one hour after the initiation of the polymerization until the beginning of the inner pressure reduction.

After completion of the reaction, the unreacted monomer was recovered. After the polymer slurry was discharged, parts with which vinyl chloride was contacted during the polymerization such as the inner walls of the polymerization tank, the inside of the reflux condenser, stirring blades and baffles were lightly washed with water. The application of the coating solution and the polymerization batches were repeated 30 times in total. The reduction in cooling capacity of the polymerization tank or reflux condenser was not recognized during the operation and the deposition of the adhering polymer on the walls was not observed.

EXAMPLE 7

The coating solution of resol/orthanilic acid copolycondensate obtained in Preparation Example 4 was applied to the inner walls of a 300 l. stainless steel polymerization tank at a rate of 0.5 $g/m^2$ with a sprayer and then the walls were washed with water. After the above treatment, 200 kg of deionized water, 0.05 kg of lauroyl peroxide, 0.15 kg of hydroxypropylcellulose and 5 kg of vinyl acetate were charged therein. Air in the tank was removed by means of a vacuum pump. Then, 95 kg of vinyl chloride was charged therein and the reaction was continued at 65° C. until the pressure reached 5 $kg/cm^2$. After completion of the reaction, the unreacted monomer was recovered. After the polymer slurry was discharged, the polymer left on the inner walls of the polymerization tank was examined. The amount of the adhering polymer was only 30 g and it could easily been removed with water of a hydraulic pressure of 2 $kg/cm^2$.

COMPARATIVE EXAMPLE 4

The resol obtained in Preparation Example 1 for the preparation of phenol/formaldehyde precondensate was dissolved in 2% aqueous sodium hydroxide solution to obtain a coating solution having a concentration adjusted to 5 wt. %. The coating solution was sprayed on the inner walls of a 7 $m^3$ stainless steel polymerization tank at a rate of 0.5 $g/m^2$ with a sprayer and then dried by heating at 80° C. for two hours. By this treatment, the condensate was cross-linked on the inner walls of the polymerization tank and the coating film was hardened to such a degree that it was insoluble in 10 wt. % aqueous sodium hydroxide solution. The walls boated with the layer of hardened phenol/formaldehyde condensate had a poor wettability by water and high water-repelling properties.

After the above treatment, 3000 kg of deionized water, 0.5 g of 2,2'-azobis-2,4-dimethylvaleronitrile and 1 kg of partially saponified polyvinyl alcohol having a saponification degree of 80 molar % were charged therein. Air in the tank was removed by means of a vacuum pump. Then, 2000 kg of vinyl chloride was charged therein and the reaction was continued at 57° C. until the pressure reached 5 $kg/cm^2$. After completion of the reaction, the unreacted monomer was recovered. After the polymer slurry was discharged, the conditions of the inner walls of the polymerization tank were examined. A large amount of the polymer left in the form of a film over the inner walls was recognized.

This comparative example indicates that if the condensation reaction of phenol/formaldehyde is effected to a high degree to cross-link the condensate, the coating film has a water-repellency to lose the effect of preventing the adhesion of the polymer.

COMPARATIVE EXAMPLE 5

For comparison, the results obtained by carrying out the process of U.S. Pat. No. 4,093,787 will be shown:

69 g (0.5 mole) of p-hydroxybenzoic acid, 100 g of water, 50 g of 30 wt. % formalin (0.5 mole formaldehyde) and 15 g of concentrated hydrochloric acid were charged in a three-necked flask provided with a reflux condenser. The reaction was carried out under reflux for about one hour until the condensate precipitated. Then, the reaction mixture was cooled to about 60° C. and 40 wt. % aqueous sodium hydroxide solution was washed thereto continuously until the condensate had completely been dissolved. The resulting solution had pH 9.8. The solution will hereinafter be referred to as solution A. Separately, 69 g (0.5 mole) of p-hydroxybenzoic acid was mixed with 50 g of 30 wt. % formalin (0.5 mole formaldehyde) and then 40 wt. % aqueous sodium hydroxide solution was added to the mixture until p-hydroxybenzoic acid had been dissolved. The resulting solution had pH 9.8. The solution will hereinafter be referred to as solution B.

Solution B was added to solution A and the mixture was heated to 95° C. over 15 minutes and allowed to react under reflux for 20 minutes. The resulting condensate was precipitated with dilute hydrochloric acid, filtered out, washed with water and dried under vacuum.

Thus obtained condensate was dissolved in ethanol to obtain a coating solution having a concentration controlled to 10 wt. %.

The coating solution was sprayed on inner walls of a 7 m$^3$ stainless steel polymerization tank at a rate of 0.5 g/m$^2$ with a sprayer and dried by heating at 80° C. for 30 minutes. Thus, the condensate was cross-linked on the inner walls of the polymerization tank and the coating film was hardened to such a degree that it was insolubilized in 10 wt. % aqueous sodium hydroxide solution. The walls coated with the layer of hardened p-hydroxybenzoic acid/formaldehyde condensate had a poor wettability by water and high water-repelling properties.

After the above treatment, vinyl chloride was polymerized in the same manner as in Comparative Example 4 except that the coating solution applied was different from that in Comparative Example 4. The conditions of the inner walls of the polymerization tank were examined. A thin film of the polymer was recognized over the whole inner walls.

PREPARATION EXAMPLE 5

Preparation of phenol/formaldehyde precondensate 2256 g (24 moles) of phenol, 2404 g (38.4 moles) of 40 wt. % formalin and 121.2 g (1.2 moles) of triethylamine were charged in a reactor provided with a reflux condenser and the mixture was allowed to react at 85° C. for two hours. Then, unreacted formalin was completely removed at that temperature under reduced pressure to obtain a resol having a solid concentration of 75 wt. %. The molecular weight of the resulting resol was measured by gel permeation method to reveal that it had 1–3 nuclei in average. The resol was used for the copolycondensation in following Preparation Examples 6 and 7.

Separately, a part of the resol was taken and dissolved in 2 wt. % aqueous sodium hydroxide solution to obtain a resol coating solution having a solid concentration adjusted to 5 wt. %. The resol coating solution was also used for the coating.

PREPARATION EXAMPLE 6

Preparation of resol/resorcin copolycondensate coating solution 1000 g of the resol obtained in Preparation Example 5 was charged in a reactor provided with a reflux condenser. 110 g of resorcin and 20.2 g of triethylamine were added thereto and the copolycondensation reaction was carried out at 85° C. for two hours. Then, the copolycondensate was dissolved in 2 wt. % aqueous sodium hydroxide solution to obtain a solution having a solid concentration adjusted to 5 wt. %.

PREPARATION EXAMPLE 7

Preparation of resol/sulfanilic acid copolycondensate coating solution 1000 g of the resol obtained in Preparation Example 5 was charged in a reactor provided with a reflux condenser. 173 g of sulfanilic acid (p-aminobenzenesulfonic acid) and 20.2 g of triethylamine were added thereto and the copolycondensation reaction was carried out at 85° C. for two hours. Then, the copolycondensate was dissolved in 2 wt. % aqueous sodium hydroxide solution to obtain a solution having a solid concentration adjusted to 5 wt. %.

EXAMPLE 8 and COMPARATIVE EXAMPLES 6 and 7

The coating solutions prepared in Preparation Examples 5, 6 and 7 were sprayed on the inner walls of a 7 m$^3$ stainless steel polymerization tank at a rate of 0.5 g/m$^2$ with a sprayer. The walls were washed with deionized water. More particularly, the resol/sulfanilic acid copolycondensate coating solution obtained in Preparation Example 7 was used in Example 8, the resol coating solution obtained in Preparation Example 5 was used in Comparative Example 6 and the resol/resorcin copolycondensate coating solution obtained in Preparation Example 6 was used in Comparative Example 7.

After the above treatment, 3000 kg of deionized water, 0.6 kg of tert. butyl peroxypivalate and 2 kg of partially saponified polyvinyl alcohol having a saponification degree of 80 molar % were charged therein. Air in the vessel was removed by means of a vacuum pump. Then, 2000 kg of vinyl chloride was charged therein and the reaction was carried out at 57° C. until a pressure of 5 kg/cm$^2$ was attained. After completion of the reaction, the unreacted monomer was recovered. After discharging the polymer slurry, the inner walls of the polymerization tank were washed with water of a hydraulic pressure of as low as 5 kg/cm$^2$ and the amount of the polymer removed from the walls by washing with water was examined. Then, the polymer remaining on the wall after washing with water was removed by human power and the amount thereof was examined.

As shown in Table 2, according to the process of the present invention, the adhesion of the polymer was small in amount in both parts contacted with the liquid phase and gas phase and the adhering polymer could easily be washed away with water of a low hydraulic pressure.

TABLE 2

|  | Run No. | | Example 7 | Comparative Example 6 | Comparative Example 7 |
|---|---|---|---|---|---|
|  | Coating | | Resol-sulfanilic acid copolycondensate | Resol precondensate | Resol/resorcin copolycondensate |
|  | Reaction time (hr.) | | 11.5 | 11.0 | 11.0 |
| Polymer adhered | Amount removed by washing with water (g) | Liquid phase | 5 | 100 | 20 |
|  |  | Gas phase | 0 | 20 | 0 |
|  | Amount removed by the human power (g) | Liquid phase | 0 | 200 | 50 |
|  |  | Gas phase | 0 | 40 | 0 |

EXAMPLES 9-16

Vinyl chloride was polymerized in the same manner as in Example 8 except that 0.2 kg of a polar organic compound shown in Table 3 was added together with the dispersant and the catalyst. The results are shown in Table 3. The adhesion of the polymer was substantially not observed.

TABLE 3

| | | | Amount of polymer adhered | | | |
|---|---|---|---|---|---|---|
| | | | Amount of polymer removed by washing with water | | Amount of polymer removed by human power | |
| Run No. | Coating | Polar organic compound | Liquid phase (g) | Gas phase (g) | Liquid phase (g) | Gas phase (g) |
| Example 9 | Resol/sulfanilic acid copolycondensate | Cetyl alcohol | 4 | 0 | 0 | 0 |
| Example 10 | Resol/sulfanilic acid copolycondensate | Calcium stearate | 2 | 0 | 0 | 0 |
| Example 11 | Resol/sulfanilic acid copolycondensate | Calcium citrate | 0 | 0 | 0 | 0 |
| Example 12 | Resol/sulfanilic acid copolycondensate | Stearic acid monoglyceride | 2 | 0 | 0 | 0 |
| Example 13 | Resol/sulfanilic acid copolycondensate | Butyl acid phosphate | 0 | 0 | 0 | 0 |
| Example 14 | Resol/sulfanilic acid copolycondensate | Stearic acid/sucrose ester | 2 | 0 | 0 | 0 |
| Example 15 | Resol/sulfanilic acid copolycondensate | Ascorbic acid | 2 | 0 | 0 | 0 |
| Example 16 | Resol/sulfanilic acid copolycondensate | Disodium calcium ethylenediaminetetraacetate | 0 | 0 | 0 | 0 |

What is claimed is:

1. A process for the homopolymerization of vinyl chloride or the copolymerization thereof with a monomer copolymerizable therewith in an aqueous medium or by mass polymerization technique, characterized in that the inner walls of a polymerization tank and other parts of a polymerization apparatus system which are to be contacted with the monomer(s) are previously coated with a layer of a copolycondensate obtained by reacting a resol type phenol/aldehyde precondensate prepared in the presence of a basic catalyst with a nitrogen-containing compound selected from the group consisting of nitrophenols, nitrobenzoic acids, nitrobenzenesulfonic acids, aminophenols, aminobenzoic acids and aminobenzenesulfonic acids.

2. A process according to claim 1 wherein the copolycondensate is compatible with 10 wt. % aqueous sodium hydroxide solution and contains 1-20 benzene nuclei in the molecule.

3. A process according to claim 1 wherein the copolycondensate is applied in the form of an aqueous alkali solution thereof having a solid concentration in the range of 0.05-15 wt. %.

4. A process according to claim 1 wherein a polar organic compound compatible with the copolycondensate and capable of forming a hydrophilic coating film having a contact angle with water of up to 2° on the inner walls of the polymerization tank is added to the reaction system in the polymerization of vinyl chloride.

* * * * *